US006547256B2

(12) United States Patent
Aksit et al.

(10) Patent No.: US 6,547,256 B2
(45) Date of Patent: Apr. 15, 2003

(54) CLOTH RING SEAL

(75) Inventors: Mahmut F. Aksit, Troy, NY (US); Jeffrey A. Benoit, Scotia, NY (US); Abdul-Azeez Mohammed-Fakir, Schenectady, NY (US); Osman S. Dinc, Troy, NY (US)

(73) Assignee: General Electric Company, Schenectady, NY (US)

( * ) Notice: Subject to any disclaimer, the term of this patent is extended or adjusted under 35 U.S.C. 154(b) by 58 days.

(21) Appl. No.: 09/747,014

(22) Filed: Dec. 26, 2000

(65) Prior Publication Data

US 2002/0079655 A1 Jun. 27, 2002

(51) Int. Cl.$^7$ ................................................. F16J 15/02
(52) U.S. Cl. ...................... 277/628; 277/500; 277/534; 277/537; 277/650
(58) Field of Search ................................ 277/500, 510, 277/534, 537, 627, 628, 650, 651

(56) References Cited

U.S. PATENT DOCUMENTS

| | | | |
|---|---|---|---|
| 4,178,000 A | * 12/1979 | Kuttner | 164/425 |
| 4,209,177 A | * 6/1980 | Hall | 277/608 |
| 4,214,761 A | * 7/1980 | Pippert | 277/530 |
| 4,453,723 A | 6/1984 | Greenwald | |
| 4,659,091 A | * 4/1987 | Baasner et al. | 264/257 |
| 5,104,286 A | 4/1992 | Donlan | |
| 5,209,503 A | 5/1993 | Heibel et al. | |
| 5,265,412 A | 11/1993 | Bagepalli et al. | |
| 5,400,586 A | 3/1995 | Bagepalli et al. | |
| 5,441,168 A | * 8/1995 | Carlini | 220/378 |
| 5,474,306 A | 12/1995 | Bagepalli et al. | |
| 5,509,669 A | 4/1996 | Wolfe et al. | |
| 5,586,773 A | 12/1996 | Bagepalli et al. | |
| 5,653,450 A | * 8/1997 | De Villepoix et al. | 277/649 |
| 5,657,998 A | 8/1997 | Dinc et al. | |
| 5,915,697 A | 6/1999 | Bagepalli et al. | |
| 5,934,687 A | 8/1999 | Bagepalli et al. | |
| 6,010,132 A | * 1/2000 | Bagepalli et al. | 277/355 |
| 6,042,119 A | 3/2000 | Bagepalli et al. | |
| 6,328,310 B1 | * 12/2001 | Chikaraishi | 277/314 |

FOREIGN PATENT DOCUMENTS

EP          0 989 287 A2       3/2000

* cited by examiner

Primary Examiner—Anthony Knight
Assistant Examiner—Enoch E Peavey
(74) Attorney, Agent, or Firm—Banner & Witcoff, Ltd.

(57) ABSTRACT

A seal assembly including a low flow cloth ring seal having a cloth assemblage is provided for sealing a tubular cavity disposed between a tubular member and a mating body. The density of the cloth assemblage may be set according to a desired flow rate of gas through the cloth ring seal. In applications where more stiffness and strength is desired, the cloth ring seal may include a shim assemblage surrounded by the cloth assemblage.

27 Claims, 7 Drawing Sheets

CLOTH RING SEAL

FIELD OF THE INVENTION

The present invention is directed to seals for dynamic or rotating applications. More particularly, the present invention relates to a cloth ring seal for dynamic and rotating applications.

BACKGROUND OF THE INVENTION

Seals can be used to minimize leakage of fluids including gas in applications where two relative movable mechanical members are in close proximity. The members may have substantial relative motion between one another, such as a turbine shaft against lubricating oil reservoir, or a rotatable turbine stage relative to a fixed support structure having to withstand a pressure differential across the stage. Also, the movement between members may be caused by vibration or thermal growth.

Leakage of gas and air can negatively impact performance of components in many systems including a gas turbine combustion system. Mating components may be formed of different materials and can be subjected to different temperatures during operation. Consequently, the components commonly experience varying degrees of thermal growth. For example, a fuel nozzle burner tube and a combustion liner cap assembly support structure in a gas turbine move radially, axially, and circumferentially relative to one another based on thermal growth. Similar relative movement may also occur due to dynamic pulsing of the combustion process. To prevent leakage and compensate for the relative movement of the fuel nozzle burner tube, a split ring metal seal has been placed around the outer diameter of the fuel nozzle burner tube providing an interface between the burner tube and a portion the cap assembly support structure.

Rather than an airtight seal, a certain amount of leakage between the fuel nozzle burner tube and the cap assembly support structure is desired. In this regard, hot gases from the combustion reaction zone tend to "backflow" into a tubular cavity between the fuel nozzle burner tube and the cap assembly support structure components. When the hot gases flow into the tubular cavity, they can damage the hardware, which significantly shortens the usable life of the components. To prevent backflow, a certain amount of air leakage needs to be permitted to flow through the seal. In an attempt to address this concern, the conventional split ring metal seal has slots cut through the seal to allow some leakage of air.

Several problems exist with the split ring metal seal. Since the seal is metal and the interfacing components are metal, the components and seal tend to rub, vibrate or otherwise move against one another causing excessive wear of the seal and the components. Further, the burner tube and cap assembly support structure components and the seal generally do not perfectly fit together due to slight physical discrepancies resulting from manufacture. Stated differently, each component is manufactured to a particular tolerance, and is not perfectly shaped due to real world limitations. In addition, over time the components and seal will tend to change shape due to thermal distortion and physical wear. As a result, the amount of leakage of air around the burner tube cannot be effectively controlled and tends to be non-uniform, varying from one location to another.

In the past, a substantial number of seals have been employed in turbine systems. Labyrinth seals have been employed between rotating mating surfaces or vibrating mating surfaces. However, labyrinth seals do not easily conform to vibratory movement or rotating surfaces, particularly when the surfaces have imperfections. Consequently, labyrinth seals have not proven particularly effective.

Brush seals have been used in many environments including in gas and steam turbines. Brush seals generally conform better to rotating and/or vibrating mating surfaces than labyrinth seals including surfaces having imperfections. While brush seals have proven more effective than labyrinth seals, they are exceedingly expensive to manufacture and difficult to handle. For example, the very fine bristle wires of a brush seal are not bound together prior to assembly. As a result, it is an arduous process to lay out a predetermined layer of bristles to the required thickness to form a bristle pack suitable to form the resulting seal. Consequently, there is a need to provide a less expensive mechanism for providing a low leakage seal which is sufficiently resilient to accommodate the dimensional changes in the radial, axial, and circumferential directions resulting from wear and thermal growth. Also, there is a need for a seal that can regulate the amount of leakage there through.

BRIEF SUMMARY OF THE INVENTION

The present invention overcomes many of the shortcomings of prior art seals. According to an illustrative implementation of the present invention, a cloth ring seal interfaces two mating bodies in order to provide a low leakage cloth seal.

In one aspect of the invention, a low leakage cloth ring seal is provided where, based on the conditions through the interface, the cloth seal may be designed to include an area where fluids including gas can flow through at least portion of the cloth assemblage of the cloth ring seal. Knowing the flow conditions and the pressure differential through the interface, the density of the cloth ring seal including thickness and number of cloth layers may be designed to allow for a desired leakage amount or flow rate. In another aspect of the invention, gas flowing through the seal can be used to purge a cavity of unwanted gases and/or cool the cavity or surfaces of the mating bodies providing the cavity boundaries.

According to an aspect of the invention, a cloth ring seal is adapted to seal a tubular cavity between a first mating body and a second mating body, where the cloth ring seal has an inner circumferential portion for making sealing contact with the second mating body. In another aspect of the invention, the cloth ring seal includes a tubular cloth assemblage forming the periphery of the cloth ring seal, where a portion of the periphery of the cloth assemblage makes sealing contact with the second mating body. In still another aspect of the invention, a cloth ring seal may further include a shim assemblage surrounded by the cloth assemblage. The cloth assemblage and the shim assemblage may be tubular.

In another aspect of the invention, a high temperature, woven cloth ring seal can be provided in a tubular cavity between a burner tube of a fuel nozzle and a cap assembly to act as an interface. In another aspect of the invention, leakage through the woven cloth seal can be controlled to purge a tubular cavity separating the burner tube and cap assembly of unwanted hot gases.

These and other novel advantages, details, embodiments, features and aspect of the present invention will be apparent to those skilled in the art from following the detailed description of the invention, the attached claims and accompanying drawings, listed herein, which are useful in explaining the invention.

DETAILED DESCRIPTION OF THE INVENTION

Figure 1:
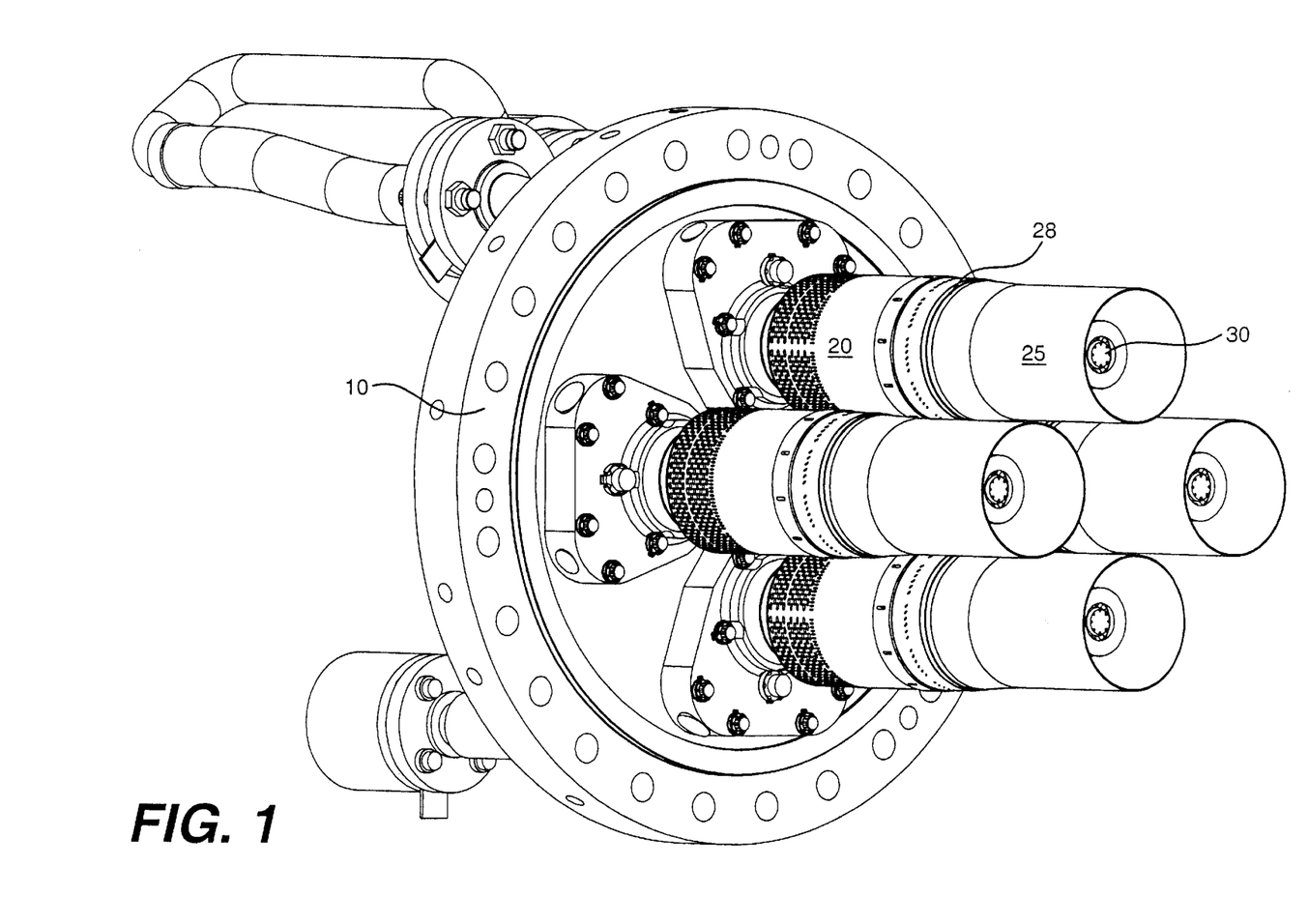
FIG. 1 shows a perspective view of an illustrative fuel nozzle and manifold assembly in a gas turbine.
Figure 2:
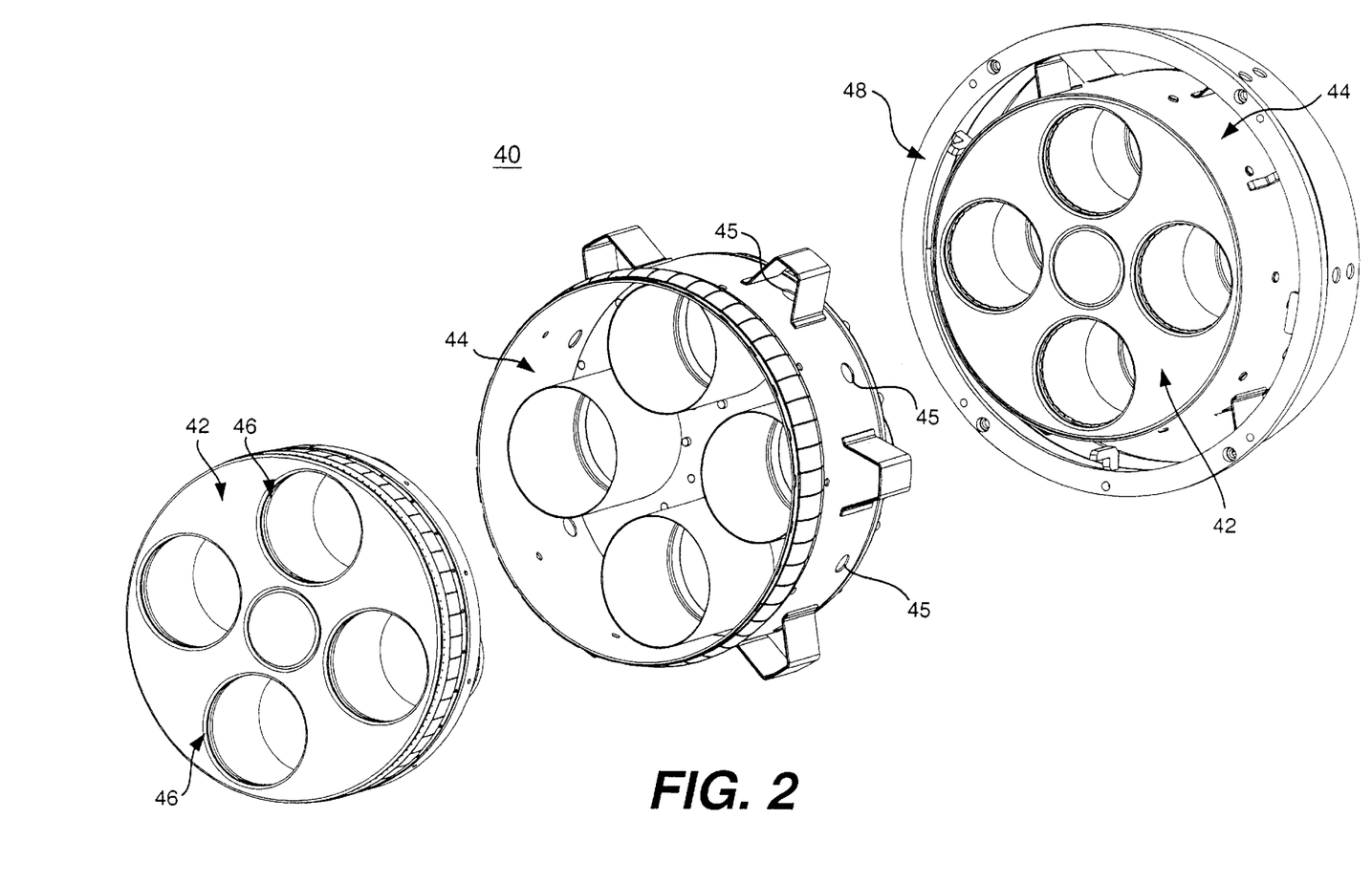
FIG. 2 shows an exploded view of an illustrative cap assembly to which plural fuel nozzles can be interfaced in a gas turbine.
Figure 3:
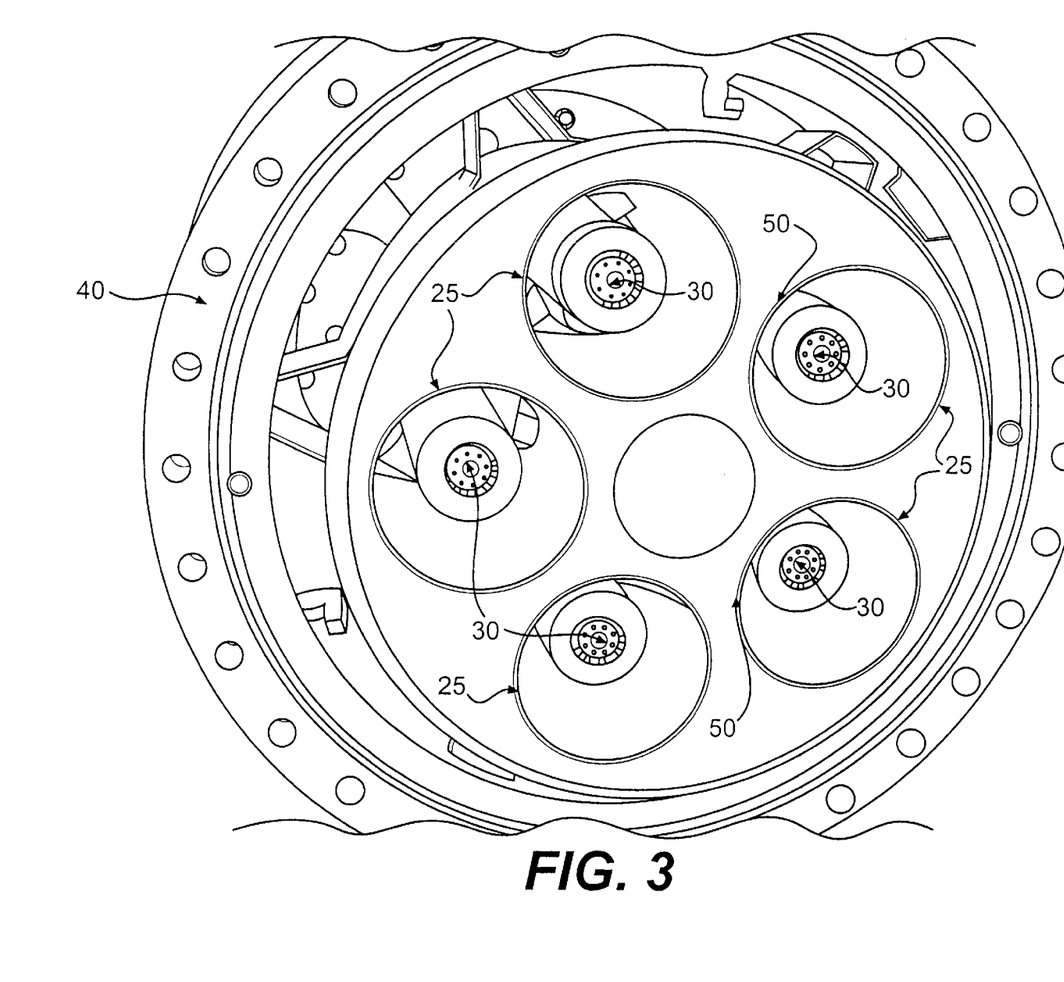
FIG. 3 shows a perspective view taken from a combustion zone of an illustrative cap assembly interfacing with a plurality of fuel nozzles in a gas turbine according to an exemplary embodiment of the present invention.

Referring to FIGS. 1–4, an exemplary gas turbine environment in which the present invention may be implemented is shown. In gas turbines, plural combustors are disposed in an annular array around the axis of the machine. As shown in FIG. 1, each combustor includes plural fuel nozzles 20, which are attached to a fuel manifold plate 10 called an endcover. The number of fuel nozzles 20 may vary depending on desired performance (e.g., FIG. 3 shows five fuel nozzles and FIG. 1 shows four fuel nozzles). Each fuel nozzle 20 has many components including the burner tube 25, which is to the remainder of the fuel nozzle 20 by, for example, a weld 28. Also, each fuel nozzle 20 has a diffusion gas tip 30. The fuel nozzles 20 penetrate through a structure called a cap assembly 40, which provides the boundary between compressor air used for the combustion process and a combustion burning zone. A burner tube 25 of each fuel nozzle 20 engages the cap assembly 40 through an interface (not shown in FIGS. 1–3). The interface is located in a tubular cavity 50 between the burner tube 25 and the cap assembly 40. The fuel nozzle 20 allows gas and air to premix in the premixer zone 52 of the burner tube 20 prior to the actual combustion in the combustion burning zone or "reaction zone". The combustion burning zone is directly downstream from the diffusion gas tip 30 of the burner tube 25. Premixing of gas and air prior to combustion allows a more uniform fuel/air mixture and is important in minimizing emissions in gas turbines.

Figure 4:
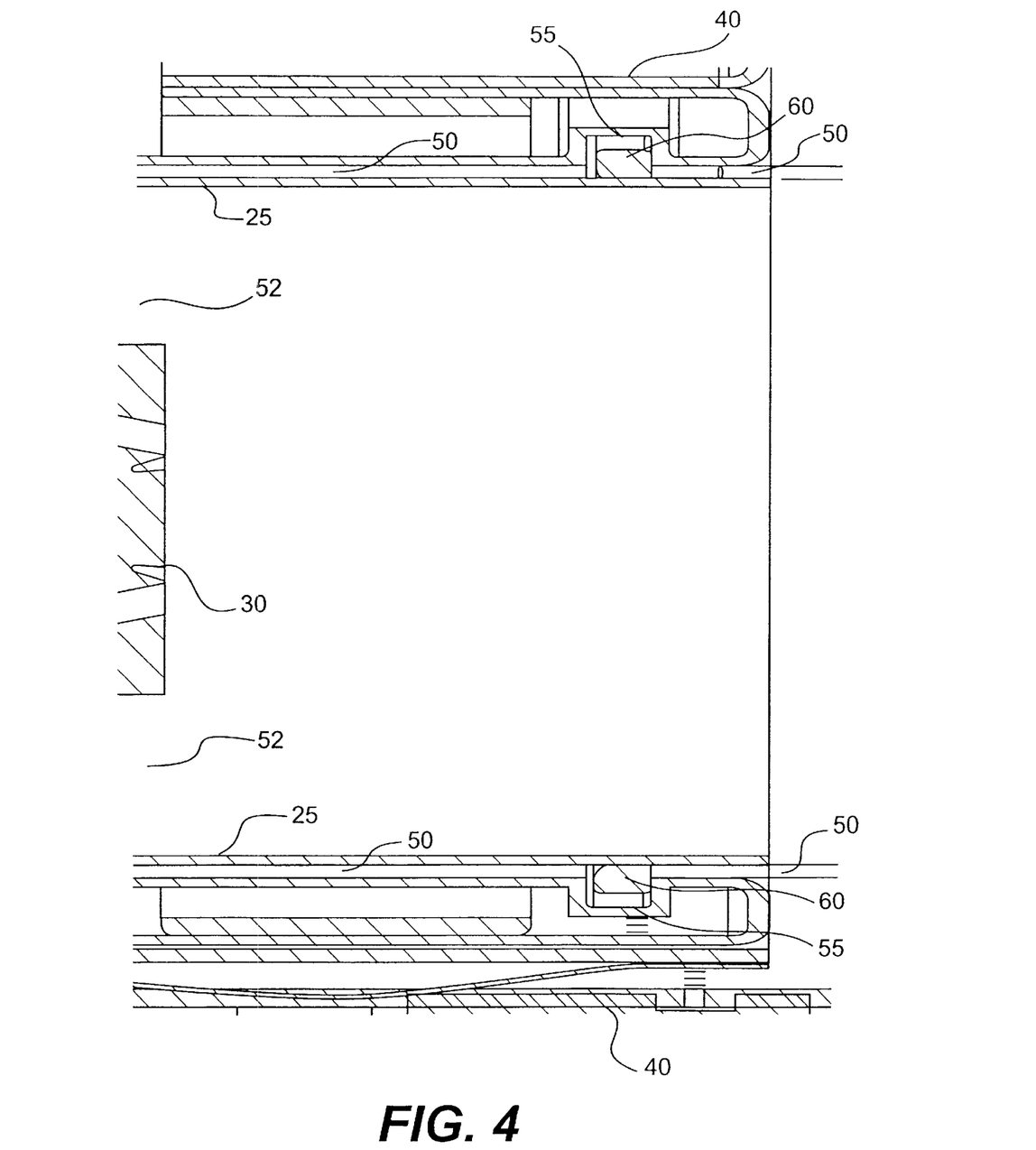
FIG. 4 shows a partial cross section of the interface region between the cap assembly and fuel nozzle according to an exemplary embodiment of the present invention.

Referring to the exploded view of the cap assembly 40 depicted in FIG. 2, the cap assembly 40 includes inner body assembly 42, outer body assembly 44 and outer barrel assembly 48. The outer barrel assembly 48 is shown with the outer body assembly 44 coupled thereto and the inner body assembly 42 coupled to the outer body assembly 44. Four fuel nozzles 20 engage with the cap assembly 40 in the four tubular holes in the outer body assembly 44. In an illustrative embodiment of the present invention, the locations 46 represent exemplary portions of the cap assembly 40 where a seal can interface with the burner tube of the fuel nozzle. Air can flow through holes 45 (in FIG. 2) and eventually into the tubular cavity 50 between the cap assembly 40 and the burner tube 25 as shown in FIG. 3. FIG. 4 depicts a partial cross section of the cap assembly 40 with the burner tube 25 engaged therein. As shown, a seal assembly 60 including the cloth seal is placed in the tubular cavity 50 between the burner tube 25 and the cap assembly 40. A seal retainer 55 couples the seal assembly 60 to the cap assembly 40. The seal retainer 55 may be permanently fixed to and part of the cap assembly 40.

Figure 5:
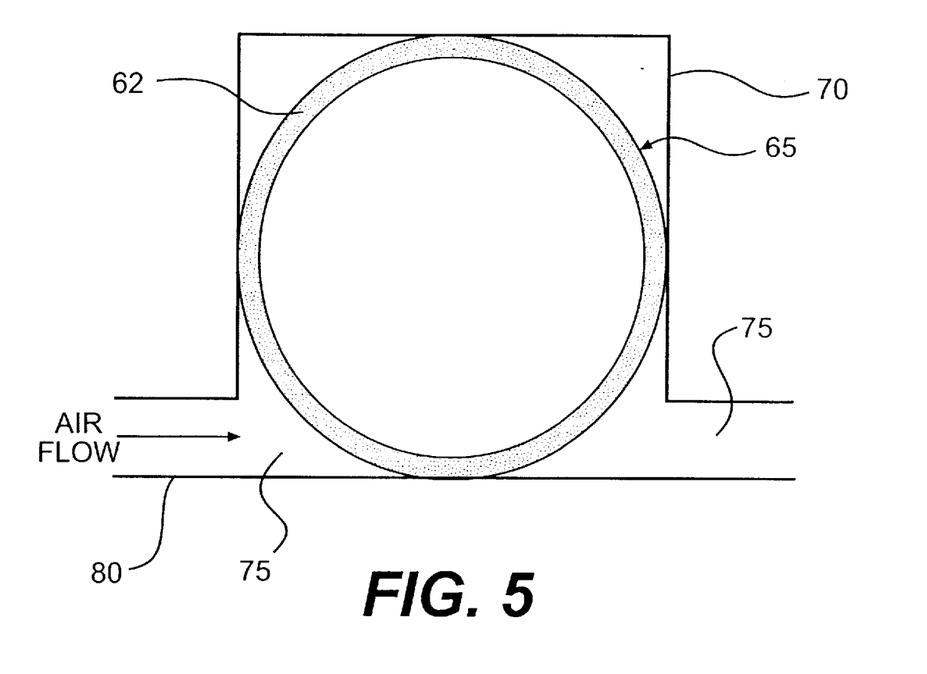
FIG. 5 shows a cross-sectional view of an illustrative cloth seal configuration according to a first exemplary embodiment of the present invention.
Figure 6:
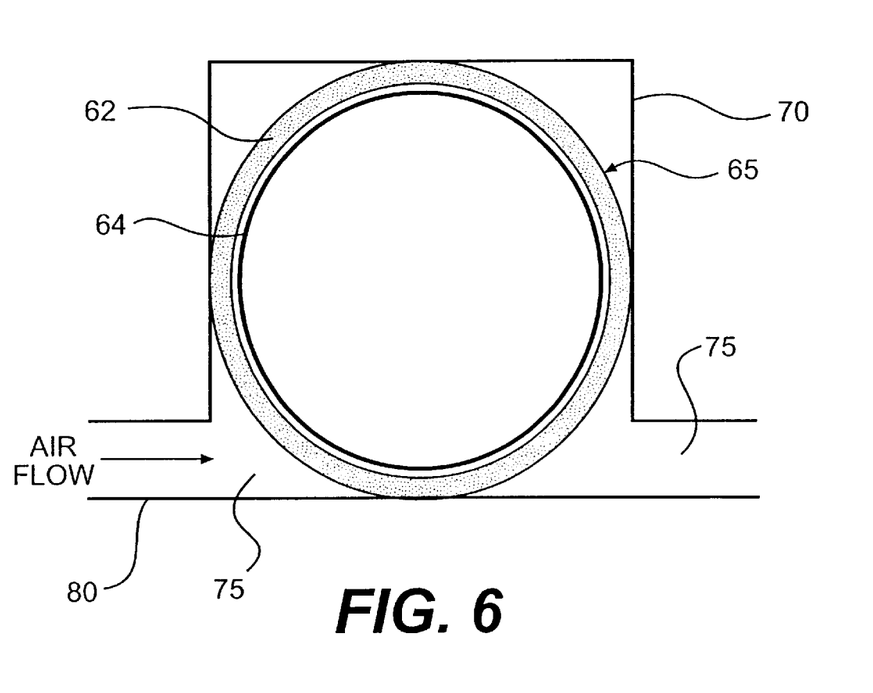
FIG. 6 shows a cross-sectional view of an illustrative cloth seal configuration according to a second exemplary embodiment of the present invention.
Figure 7:
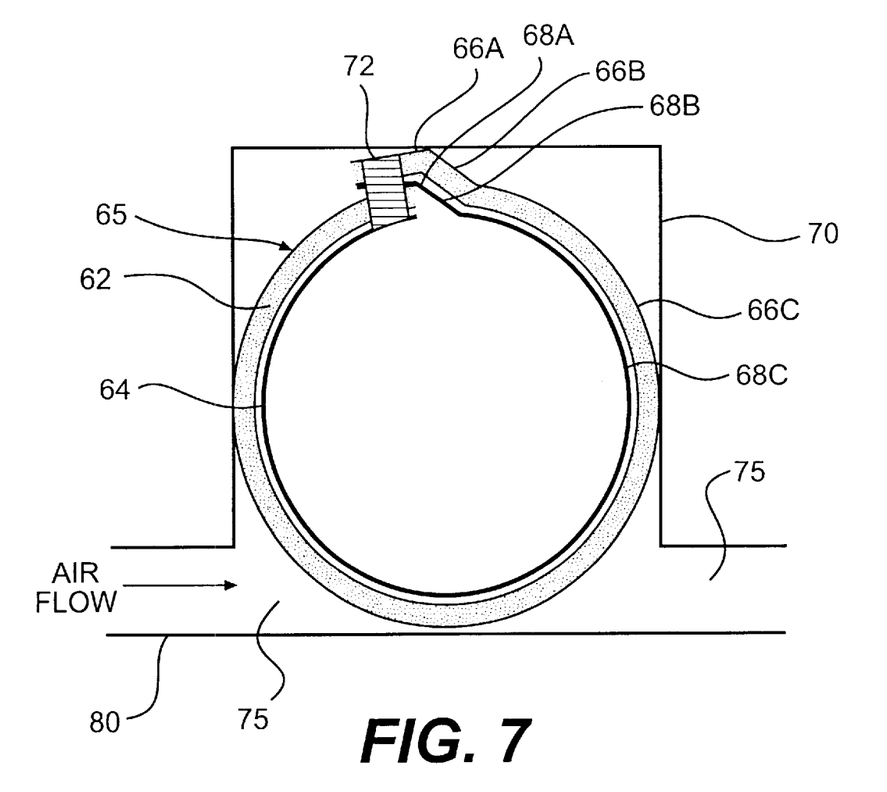
FIG. 7 shows a cross-sectional view of an illustrative cloth seal configuration according to a third exemplary embodiment of the present invention.

FIGS. 5–7 illustrate exemplary cloth ring seal configurations that may be employed as the interface between burner tube 25 and cap assembly 40 shown in FIG. 4. It should be understood that the cloth seal configurations in FIGS. 5–7 may be used as low leakage seals for both static applications, such as around nozzles or tubes, and dynamic applications, such as around rotating components in, but not restricted to, gas or steam turbine environments.

The embodiments of FIGS. 5–7 illustrate a cloth ring seal 65 extending from a first mating body 70 through a tubular cavity 75 between the first mating body 70 and a second mating body 80 and making sealing contact with the second mating body 80. The cloth ring seal 65 has an inner circumferential portion which makes sealing contact with the second mating body 80. In a preferred implementation of each embodiment, the second mating body is a tubular member such as a nozzle. It should be understood that the second mating body 80 could be a static or rotating component. The cloth ring seal 65 has a cloth assemblage 62, which as shown in the illustrative embodiments of FIGS. 5 and 6 for example, can be used to define the outer periphery of the cloth ring seal 62. As shown in FIGS. 5–7, an outer periphery of the cloth assemblage 62 can comprise the inner circumferential portion of the cloth ring seal 65 which extends into the tubular cavity 75 and makes sealing contact with the second mating body 80. The cloth assemblage 62 can surround a cavity in a central portion of the cloth ring seal 65. The cavity can be a tubular void.

The cloth ring seal 65 can be sandwiched between metal plates (not shown) or otherwise coupled to another portion of the seal assembly. The seal assembly is physically attached to the first mating body 70.

In contrast to the exemplary embodiment of FIG. 5, FIG. 6 further includes a shim assemblage 64 such as a sheet metal tube enclosed by a layer of cloth of the cloth assemblage 62. The outer periphery of the shim assemblage 64 may oppose the inner periphery of the cloth assemblage 62. The inner periphery of the shim assemblage 64 may oppose the periphery of the cavity with the shim assemblage 64 surrounding or enclosing the cavity (e.g., tubular void). Each of the cloth assemblage 62 and the shim assemblage 64 may be tubular.

The cloth ring seal 65 of FIG. 7, while providing sealing functionality equivalent to the cloth ring seal 65 of FIG. 6, illustrates a structural manufacturing alternative to the embodiment of FIG. 6. The cloth ring seal 65 of FIG. 7 has a cloth assemblage 62 including planar cloth strips 66A and 66B which may be stitched together and an arcuate cloth portion 66C. The arcuate cloth portion 66C has a first end coupled (e.g., stitched) to a planar cloth strip 66B and a second end coupled (e.g., stitched) to a planar cloth strip 66A. The arcuate cloth portion 66C and the planar cloth strips 66A, 66B form a closed loop.

Also, the cloth ring seal 65 of FIG. 7 further includes a shim assemblage 64 with an outer peripheral portion opposing an inner peripheral portion of the cloth assemblage 62. The shim assemblage 64 includes two planar shim strips 68A, 68B welded together and an arcuate shim portion 68C.

The arcuate shim portion 68C has a first end coupled (e.g., welded) to a planar shim strip 68B and a second end coupled (e.g., welded) to a planar shim strip 68A. The arcuate shim portion 68C and the planar shims strips 68A, 68B form a closed loop.

A joining member 72 as shown in FIG. 7 can couple the arcuate cloth portion 66C to planar cloth strip 66A. Also, the joining member 72 can couple the arcuate shim portion 68C to planar shim strip 68A. In the embodiment of FIG. 7, the joining member 72 couples the cloth assemblage 62 to the shim assemblage 64 and in particular couples together arcuate cloth shim portion 68C, arcuate cloth portion 66C, planar shim strip 68A and planar cloth strip 66A. The joining member 72 may be a slotted tab or other fastening device. While two planar cloth strips are shown in FIG. 7, multiple planar cloth strips may be connected together by being stitched together as necessary for ease of manufacturing.

The cloth assemblage in the embodiment of FIG. 5 and the cloth-shim assemblages in the embodiments of FIGS. 6 and 7 are designed to permit leakage of fluids (e.g., gas such as air) through the seal. It should be understood that leakage according to embodiments of the invention will be described below in terms of gas leakage, and that such description is merely illustrative and that the present invention may be applied to leakage of fluids other than gas.

In the embodiments of the present invention depicted in FIGS. 5–7, leakage occurs at least through the cloth assemblage 62 portion of the cloth seal 65 between the inner circumferential portion of the shim assemblage 64 located closest to the mating body 80 and the inner circumferential portion of the cloth seal 65 contacting the second mating body 80. The cloth assemblage 62 is porous, and can provide some controlled leakage to provide airflow such as cooling air to downstream locations. In FIGS. 5–7, the arrows show the airflow direction. For the cross-sections shown FIGS. 5–7, airflow is from the left region of the cavity 75 through the cloth ring seal 65 to the right region of the cavity 75. In FIG. 5, the cloth seal 65 does not include a shim assemblage. The cloth seal 65 of FIG. 5 may be utilized in applications where high flow rates are desired, such as for cooling.

According to embodiments of the invention, the cloth assemblage 62 of the cloth seal 65 is flexible and includes at least one layer of cloth. Alternatively, the cloth layer may include two overlying layers of cloth. Each cloth layer may include metal, ceramic and/or polymer fibers that have been woven, knitted or pressed into a layer of fabric. Each cloth layer provides sacrificial wear volume and wear resistance without a significant increase in stiffness to the seal. Cloth layers, due to their porosity, are more resilient than metal layers. Thus, cloth seals can more readily adapt to the changing size and shape of mating bodies caused by thermal distortion, vibration and other relative movement, thereby providing an effective seal. In embodiments such as FIGS. 6 and 7, the cloth assemblage 62 can reduce heat conducted to the shim assemblage 64, thereby lessening structural degradation to the mating bodies 70, 80 caused by friction, for example when metal rubs against metal.

Choices as to the construction of the cloth layer (e.g., woven, knitted or pressed), the material(s) selected for the cloth layer, and the thickness of the cloth layer can be made by one skilled in the art when desiring to tune or calibrate the seal based on the wear resistance, flexibility and sealing requirements associated with the particular seal application. Multiple cloth layers can include different materials, different layer construction (e.g., woven, knitted or pressed), and/or have different thicknesses or densities depending on the seal application. In turbine applications, the cloth layer is preferably woven (e.g., using a Dutch Twill weave). An exemplary cloth assemblage used in turbine applications employs a Dutch Twill woven cloth layer, the cloth layer being made of a high-temperature Cobalt-based super-alloy such as L-605 or Haynes-25. Other low stiffness and low friction abradable cloth layers can be used depending on the application. For example, Teflon may be used as a cloth layer for low temperature applications.

The shim assemblage 64 of the cloth seals in FIGS. 6 and 7 can be flexible, resilient, generally imperforate, and generally impervious to gas. The shim assemblage 64 can provide blockage for through cloth leakage, structural stiffness to withstand pressure loads, and resiliency necessary for recovery following interference/excursion, i.e., displacement from a free state. The resilient quality of the shim assemblage 64 maintains the sealing properties of the cloth seal while allowing for different surface shapes, assembly misalignment, vibration and/or thermally-induced relative movement between the first mating body 70 and the second mating body 80. Thus, the flexible shim assemblage 64 serves as a structural member carrying the pressure loads while providing some resiliency, which allows the cloth seal to recover after interference or excursion.

The shim assemblage 64 comprises at least one shim (thin metal layer) layer, but may comprise two or more superimposed shim layers for increased strength. For turbine applications, the shim assemblage preferably contains four or fewer shim layers. The shim assemblage 64 may have sliced and/or staggered pieces of sheet metal spot-welded together to add flexibility, while maintaining strength, and/or to help the seal conform to the curvature of surfaces of the mating bodies. The choices of materials for the shim assemblage and the thickness of each layer of shim can be made by one skilled in the art to tune or calibrate the seal in accordance with sealing, flexibility and resiliency needs of the particular seal application. Each shim layer includes a metal, ceramic and/or polymer sheet. For turbine applications, the shim assemblage generally has a thickness between $1/100$ and $1/8$ of an inch and each shim layer includes a high temperature, cobalt based super-alloy, such as Inco-750 or HS-188.

Applying the cloth seal to the gas turbine application shown in FIGS. 1–4, the first mating body corresponds to the cap assembly 40 including the seal retainer 55 which is fixedly attached thereto, the second mating body corresponds to the fuel nozzle 20, and more particularly burner tube 25, and the cavity 75 corresponds to the tubular cavity 50. In this application, the air flows from the internal side of the cap assembly (i.e., high pressure side) to the side opening into the combustion zone (i.e., low pressure side).

Referring to FIGS. 3 and 4, a fuel/air premixture exits a premixer zone 52 between the burner tube 25 and diffusion gas tip 30 and enters the combustion burning zone in a swirling manner. Due to the pressure gradients caused by the swirling mixture, some of the hot gases tend to back flow into the tubular cavity 50. The backflow of hot gases into the tubular cavity 50 can damage the hardware including the burner tube 25 and cap assembly 40. To prevent this problem and to purge the tubular cavity of hot gases, a cloth seal according to exemplary embodiments of the present invention shown in FIGS. 5–7 can be used as an interface between the burner tube 25 and cap assembly 40. The exemplary cloth ring seals according to the invention, allow air in the tubular cavity 50 to flow through the seal from the high pressure side to the low pressure side (e.g., from left to right in the cross-sectional view shown in FIGS. 5–7) forcing the hot gas backflow out of the tubular cavity 50.

The resiliency of cloth seals allows for the accommodation of any non-uniformity in the seal interface (e.g., warping, thermal distortion) in the design of the cloth seal. Also, illustrative low leakage cloth seals according to the invention can be designed to control the leakage passing through the seal by selecting the cloth seal density (e.g., effective flow area through the cloth seal assemblage 62 in FIGS. 5–7 when the shim assemblage 64 is impervious) taking into account the pressure drop through the seal interface. That is, knowing the flow conditions (i.e., pressure and temperature) and the pressure drop between the high pressure region and low pressure region, the seal density (effective flow rate through the seal) can be set to a desired leakage flow rate. In setting the desired leakage, the following relationship can be employed for incompressible flow:

$$W = A_{\mathit{eff}} \cdot \sqrt{(2g_c / RT_H) \cdot P_H \cdot (P_H - P_L)}$$

where $A_{\mathit{eff}}$=effective area of seal; $g_c$=gravitational constant; R=gas constant for air; $P_H$=upstream pressure—high pressure region pressure; $P_L$=downstream pressure—low pressure region pressure; $T_H$=high pressure region temperature and W=leakage. Embodiments of the present invention regulate fluid flow and provide uniform distribution of leakage around the cloth ring seal. By providing uniform distribution of leakage, "lean" regions and "rich" regions of leakage can be avoided, thereby increasing efficiency.

While the above example of the present invention involves a sealing interface between a cap assembly and burner tube portion of fuel nozzle in a gas turbine system, it should be understood that the present invention can apply to many other gas and steam turbine applications as well as other sealing applications. For example, embodiments of the cloth seal of the present invention include any application, whether between flat surfaces, around static or rotating tubular members or otherwise, in which flow rate control can be applied. In this regard, the cloth seal according to the invention may be a fully circular ring or it may be in tubular segments as called for in the particular application. In certain sealing applications, the cloth ring seal may be placed in a circumferential geometric opening(s) between mating bodies. A cloth seal according to illustrative embodiments of the invention can be used in the form of linear strips in applications where relative motion exists between two flat surfaces. Also, according to embodiments of the invention, a cloth ring seal may be used in series with other seals, such as cloth ring seals, brush seal and labyrinth seals, to seal two mating bodies.

While particular embodiments of the present invention have been described and illustrated, it should be understood that the invention is not limited thereto since modifications may be made by persons skilled in the art. The present application contemplates any and all modifications that fall within the spirit and scope of the underlying invention disclosed and claimed herein.

What is claimed is:

1. A seal assembly comprising:
  a cloth ring seal adapted to seal a tubular cavity between a first mating body and a second mating body, said cloth ring seal having an inner circumferential portion adapted to make sealing contact with the second mating body;
  wherein said cloth ring seal includes a cloth assemblage, the inner circumferential portion of said cloth ring seal adapted to make sealing contact with the second mating body including an outer peripheral portion of said cloth assemblage;
  wherein said cloth ring seal further includes a shim assemblage with an outer peripheral portion opposing an inner peripheral portion of said cloth assemblage, said shim assemblage including a plurality of planar shim strips welded together and an arcuate shim portion, said arcuate shim portion having a first end welded to a first planar shim strip and a second end coupled to a second planar shim strip, wherein said arcuate shim portion and said planar shims strips form a closed loop.

2. The seal assembly according to claim 1, wherein said second mating body comprises a portion of a fuel nozzle.

3. The seal assembly according to claim 1 wherein a density of said cloth ring seal is selected to control the rate of flow of a gas through said cloth ring seal.

4. The seal assembly according to claim 1, wherein said cloth ring seal includes an annular cavity disposed therein.

5. The seal assembly according to claim 4 wherein said shim assemblage is interposed between said annular cavity and said cloth assemblage.

6. The seal assembly according to claim 1, wherein said cloth assemblage and said shim assemblage are tubular.

7. The seal assembly according to claim 1 wherein said cloth assemblage includes a plurality of planar cloth strips coupled together.

8. The seal assembly according to claim 1, wherein said cloth assemblage is adapted to permit a flow of fluid through said cloth ring seal from a first region of said tubular cavity to a second region of said tubular cavity.

9. The seal assembly according to claim 8, wherein said fluid comprises a gas.

10. The seal assembly according to claim 1, wherein said first mating body comprises a cap assembly and second mating body comprises a fuel nozzle of a gas turbine engine.

11. The seal assembly according to claim 1, wherein said second mating body is rotatable within the cloth ring seal.

12. A seal assembly comprising:
  a cloth ring seal adapted to seal a tubular cavity between a first mating body and a second mating body, said cloth ring seal having an inner circumferential portion adapted to make sealing contact with the second mating body, said cloth ring seal further including a cloth assemblage;
  wherein said cloth ring seal further includes a shim assemblage with an outer peripheral portion opposing an inner peripheral portion of said cloth assemblage, said shim assemblage including a plurality of planar shim strips welded together and an arcuate shim portion, said arcuate shim portion having a first end welded to a first planar shim strip and a second end coupled to a second planar shim strip, wherein said arcuate shim portion and said planar shims strips form a closed loop.

13. The seal assembly according to claim 12, wherein said second mating body comprises a portion of a fuel nozzle.

14. The seal assembly according to claim 12, wherein a density of said cloth ring seal is selected to control the rate of flow of a gas through said cloth ring seal.

15. The seal assembly according to claim 12, wherein said cloth ring seal includes a cavity disposed therein.

16. The seal assembly according to claim 15, wherein said shim assemblage is interposed between said cavity and said cloth assemblage.

17. The seal assembly according to claim 12, wherein said cloth and said shim assemblage are tubular.

18. The seal assembly according to claim 12, wherein said cloth assemblage includes a plurality of planar cloth strips coupled together.

19. The seal assembly according to claim 12, wherein said cloth assemblage is adapted to permit a flow of fluid through said cloth ring seal from a first region of said tubular cavity to a second region of said tubular cavity.

20. The seal assembly according to claim 19, herein said fluid comprises a gas.

21. The seal assembly according to claim 12, wherein said first mating body comprises a cap assembly and second mating body comprises a fuel nozzle of a gas turbine engine.

22. The seal assembly according to claim 12, wherein said second mating body is rotatable within the cloth ring seal.

23. A gas turbine engine, comprising:
a cloth ring seal adapted to seal a tubular cavity between a first mating body and a second mating body, said cloth ring seal having an inner circumferential portion adapted to make sealing contact with the second mating body, said cloth ring seal further including a cloth assemblage;
wherein said cloth ring seal further includes a shim assemblage with an outer peripheral portion opposing an inner peripheral portion of said cloth assemblage, said shim assemblage including a plurality of planar shim strips welded together and an arcuate shim portion, said arcuate shim portion having a first end welded to a first planar shim strip and a second end coupled to a second planar shim strip, wherein said arcuate shim portion and said planar shims strips form a closed loop.

24. The gas turbine engine according to claim 23, wherein said cloth assemblage is adapted to permit a flow of fluid through said cloth ring seal from a first region of said tubular cavity to a second region of said tubular cavity.

25. The gas turbine engine according to claim 24, wherein said fluid comprises a gas.

26. The gas turbine engine according to claim 23, wherein said first region comprises a combustion region and the second region comprises a premixing region.

27. The gas turbine engine according to claim 23, wherein said first mating body comprises a cap assembly and second mating body comprises a fuel nozzle.

\* \* \* \* \*

UNITED STATES PATENT AND TRADEMARK OFFICE
CERTIFICATE OF CORRECTION

PATENT NO. : 6,547,256 B2
DATED : April 15, 2003
INVENTOR(S) : Mahmut F. Aksit et al.

It is certified that error appears in the above-identified patent and that said Letters Patent is hereby corrected as shown below:

<u>Column 8,</u>
Lines 13, 18 and 23, -- , -- has been inserted before "wherein";
Line 64, -- assemblage -- has been inserted before "and said shim assemblage are tubular";

<u>Column 9,</u>
Line 5, "herein" has been replaced with -- wherein --.

Signed and Sealed this

Fifteenth Day of July, 2003

JAMES E. ROGAN
*Director of the United States Patent and Trademark Office*